US009873932B2

(12) United States Patent
Bergstrom et al.

(10) Patent No.: US 9,873,932 B2
(45) Date of Patent: *Jan. 23, 2018

(54) LEAN AUSTENITIC STAINLESS STEEL CONTAINING STABILIZING ELEMENTS

(71) Applicant: ATI Properties LLC, Albany, OR (US)

(72) Inventors: David S. Bergstrom, Allison Park, PA (US); James M. Rakowski, Allison Park, PA (US); Charles P. Stinner, Gibsonia, PA (US); John J. Dunn, Sarver, PA (US); John F. Grubb, Lower Burrell, PA (US)

(73) Assignee: ATI PROPERTIES LLC, Albany, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,868

(22) Filed: Aug. 5, 2015

(65) Prior Publication Data

US 2015/0337422 A1 Nov. 26, 2015

Related U.S. Application Data

(63) Continuation of application No. 13/683,084, filed on Nov. 21, 2012, now Pat. No. 9,133,538, which is a continuation of application No. 12/034,183, filed on Feb. 20, 2008, now Pat. No. 8,337,748.

(60) Provisional application No. 61/015,264, filed on Dec. 20, 2007.

(51) Int. Cl.
| | |
|---|---|
| *C22C 38/58* | (2006.01) |
| *C22C 38/00* | (2006.01) |
| *C22C 38/50* | (2006.01) |
| *F23J 13/02* | (2006.01) |
| *F16L 11/15* | (2006.01) |
| *C22C 38/38* | (2006.01) |
| *C22C 38/42* | (2006.01) |
| *C22C 38/02* | (2006.01) |
| *C22C 38/44* | (2006.01) |
| *C22C 38/48* | (2006.01) |
| *C22C 38/52* | (2006.01) |
| *C22C 38/54* | (2006.01) |

(52) U.S. Cl.
CPC ............ *C22C 38/58* (2013.01); *C22C 38/001* (2013.01); *C22C 38/002* (2013.01); *C22C 38/02* (2013.01); *C22C 38/38* (2013.01); *C22C 38/42* (2013.01); *C22C 38/44* (2013.01); *C22C 38/48* (2013.01); *C22C 38/50* (2013.01); *C22C 38/52* (2013.01); *C22C 38/54* (2013.01); *F16L 11/15* (2013.01); *F23J 13/02* (2013.01)

(58) Field of Classification Search
None
See application file for complete search history.

(56) References Cited

U.S. PATENT DOCUMENTS

| | | | |
|---|---|---|---|
| 3,171,738 A | 3/1965 | Renshaw et al. | |
| 3,284,250 A * | 11/1966 | Scott ................. | C21D 8/005 148/327 |
| 3,592,634 A | 7/1971 | Denhard, Jr. et al. | |
| 3,599,320 A | 8/1971 | Brickner et al. | |
| 3,615,365 A | 10/1971 | McCunn | |
| 3,645,725 A | 2/1972 | Denhard, Jr. et al. | |
| 3,650,709 A | 3/1972 | Morsing | |
| 3,716,691 A | 2/1973 | Baybrook et al. | |
| 3,736,131 A | 5/1973 | Espy | |
| 3,770,426 A | 11/1973 | Kloske et al. | |
| 3,854,938 A | 12/1974 | Baybrook et al. | |
| RE28,645 E | 12/1975 | Aoki et al. | |
| 4,099,966 A | 7/1978 | Chivinsky et al. | |
| 4,170,499 A | 10/1979 | Thomas et al. | |
| 4,325,994 A | 4/1982 | Kitashima et al. | |
| 4,340,432 A | 7/1982 | Hede | |
| 4,609,577 A | 9/1986 | Long | |
| 4,798,635 A | 1/1989 | Bernhardsson et al. | |
| 4,814,140 A | 3/1989 | Magee, Jr. | |
| 4,828,630 A * | 5/1989 | Daniels ............... | A61F 2/30771 148/325 |

(Continued)

FOREIGN PATENT DOCUMENTS

| | | |
|---|---|---|
| CA | 2638289 A1 | 3/2008 |
| CA | 2674091 A1 | 7/2008 |

(Continued)

OTHER PUBLICATIONS

Machine-English translation of JP06-235048, Sakakibara Mizuo et al., "High Strength Nonmagnetic stainless steel and its production", Aug. 8, 1994.*
Habashi, F., "Historical Introduction to Refractory Metals," DOI: 10.1080/08827509808962488. Journal: Mineral Processing and Extractive Metallurgy Review, vol. 22, Issue 1 Dec. 1998, pp. 25-53. Accessed at http://www.informaworld.com/smpp/content~content=a779144442~db=all.
Hayes, E., "Chromium and Vanadium," Industrial Engineering and Chemistry, vol. 53, No. 2, pp. 105 (1961). Accessed at http://scholar.google.com/scholar?hl=en&lr=&q=stainless+steel+columbium%2C+vanadium%2C+zirconium+-patents&btnG=Search.

(Continued)

*Primary Examiner* — Deborah Yee
(74) *Attorney, Agent, or Firm* — K&L Gates LLP

(57) ABSTRACT

An austenitic stainless steel composition including relatively low nickel and molybdenum levels, and exhibiting corrosion resistance, resistance to elevated temperature deformation, and formability properties comparable to certain alloys including higher nickel and molybdenum levels. Embodiments of the austenitic stainless steel include, in weight %, up to 0.20 C, 2.0 to 9.0 Mn, up to 2.0 Si, 16.0 to 23.0 Cr, 1.0 to 7.0 Ni, up to 3.0 Mo, up to 3.0 Cu, 0.05 to 0.35 N, up to 4.0 W, $(7.5(C)) \leq (Nb+Ti+V+Ta+Zr) \leq 1.5$, up to 0.01 B, up to 1.0 Co, iron and impurities. Additionally, embodiments of the steel may include $0.5 \leq (Mo+W/2) \leq 5.0$ and/or $1.0 \leq (Ni+Co) \leq 8.0$.

26 Claims, No Drawings

(56) References Cited

U.S. PATENT DOCUMENTS

| | | |
|---|---|---|
| 4,985,091 A | 1/1991 | Culling |
| 5,047,096 A | 9/1991 | Eriksson et al. |
| RE33,753 E | 11/1991 | Vacchiano et al. |
| 5,203,932 A | 4/1993 | Kato et al. |
| 5,238,508 A | 8/1993 | Yoshitake et al. |
| 5,254,184 A | 10/1993 | Magee, Jr. et al. |
| 5,259,443 A | 11/1993 | Osada et al. |
| 5,286,310 A | 2/1994 | Carinci et al. |
| 5,298,093 A | 3/1994 | Okamoto |
| 5,340,534 A | 8/1994 | Magee |
| 5,496,514 A | 3/1996 | Yamauchi et al. |
| 5,514,329 A | 5/1996 | McCaul et al. |
| 5,624,504 A | 4/1997 | Miyakusu et al. |
| 5,672,215 A | 9/1997 | Azuma et al. |
| 5,672,315 A | 9/1997 | Okato et al. |
| 5,716,466 A | 2/1998 | Yamaoka et al. |
| 5,733,387 A | 3/1998 | Lee et al. |
| 5,849,111 A | 12/1998 | Igarashi et al. |
| 6,042,782 A | 3/2000 | Murata et al. |
| 6,056,917 A | 5/2000 | Chesseret et al. |
| 6,096,441 A | 8/2000 | Hauser et al. |
| 6,274,084 B1 | 8/2001 | Haudrechy |
| 6,395,108 B2 | 5/2002 | Eberle et al. |
| 6,551,420 B1 | 4/2003 | Bergstrom et al. |
| 6,623,569 B2 | 9/2003 | Bergstrom et al. |
| 6,824,672 B2 | 11/2004 | Lecour et al. |
| 6,949,148 B2 | 9/2005 | Sugiyama et al. |
| 6,958,099 B2 | 10/2005 | Nakamura et al. |
| 7,014,719 B2 | 3/2006 | Suzuki et al. |
| 7,014,720 B2 | 3/2006 | Iseda |
| 7,070,666 B2 | 7/2006 | Druschitz et al. |
| 7,090,731 B2 | 8/2006 | Kashima et al. |
| 7,101,446 B2 | 9/2006 | Takeda et al. |
| 7,842,434 B2 | 11/2010 | Rakowski et al. |
| 7,981,561 B2 | 7/2011 | Rakowski et al. |
| 8,313,691 B2 | 11/2012 | Bergstrom et al. |
| 8,337,748 B2 | 12/2012 | Rakowski et al. |
| 8,337,749 B2 | 12/2012 | Bergstrom et al. |
| 8,858,872 B2 | 10/2014 | Bergstrom et al. |
| 8,877,121 B2 | 11/2014 | Bergstrom et al. |
| 9,121,089 B2 | 9/2015 | Bergstrom et al. |
| 9,133,538 B2 | 9/2015 | Rakowski et al. |
| 2002/0102178 A1 | 8/2002 | Hiramatsu et al. |
| 2003/0021716 A1 | 1/2003 | Hauser et al. |
| 2003/0086808 A1 | 5/2003 | Sundstrom et al. |
| 2003/0099567 A1 | 5/2003 | Suzuki et al. |
| 2003/0121567 A1 | 7/2003 | Sugiyama et al. |
| 2003/0231976 A1 | 12/2003 | Iseda |
| 2005/0103404 A1 | 5/2005 | Hsieh et al. |
| 2005/0158201 A1 | 7/2005 | Park et al. |
| 2005/0194073 A1 | 9/2005 | Hamano et al. |
| 2005/0211344 A1 | 9/2005 | Omura et al. |
| 2005/0232805 A1 | 10/2005 | Takeda et al. |
| 2006/0196582 A1 | 9/2006 | Lindh |
| 2006/0285993 A1 | 12/2006 | Rakowski |
| 2014/0369882 A1 | 12/2014 | Bergstrom et al. |
| 2015/0010424 A1 | 1/2015 | Bergstrom et al. |

FOREIGN PATENT DOCUMENTS

| | | | |
|---|---|---|---|
| EP | 0151487 A2 | 8/1985 | |
| EP | 0156778 A2 | 10/1985 | |
| EP | 0171868 A1 | 2/1986 | |
| EP | 0260022 A2 | 3/1988 | |
| EP | 0314649 B1 | 5/1989 | |
| EP | 0694626 A1 | 1/1996 | |
| EP | 0750053 A1 | 12/1996 | |
| EP | 0659896 B1 | 4/1997 | |
| EP | 1061151 A1 | 12/2000 | |
| EP | 1106706 A1 | 6/2001 | |
| EP | 1645649 A1 | 4/2006 | |
| EP | 1690957 A1 | 8/2006 | |
| GB | 882983 | 11/1961 | |
| GB | 1514934 A | 6/1978 | |
| GB | 2075550 A | 11/1981 | |
| GB | 2166159 A | 4/1986 | |
| GB | 2205856 A | 12/1988 | |
| GB | 2359095 A | 8/2001 | |
| JP | 54-041214 A | 4/1979 | |
| JP | 56-119721 A | 9/1981 | |
| JP | 57-63666 A | 4/1982 | |
| JP | 59-211556 A | 11/1984 | |
| JP | 2-305940 A | 12/1990 | |
| JP | H4-214842 A | 8/1992 | |
| JP | 5-247592 A | 9/1993 | |
| JP | 5-295486 A | 11/1993 | |
| JP | 6-128691 A | 5/1994 | |
| JP | 6-224362 A | 8/1994 | |
| JP | 06-235048 * | 8/1994 | ............ C22C 38/58 |
| JP | 6-314411 A | 11/1994 | |
| JP | 7-060523 A | 3/1995 | |
| JP | 7-233444 A | 9/1995 | |
| JP | 7-278760 | 10/1995 | |
| JP | 8-085820 A | 4/1996 | |
| JP | 8-170153 A | 7/1996 | |
| JP | 08-260101 A | 10/1996 | |
| JP | 8-283915 A | 10/1996 | |
| JP | 09-241746 A | 9/1997 | |
| JP | 9-302446 A | 11/1997 | |
| JP | 9-310157 A | 12/1997 | |
| JP | 10-102206 A | 4/1998 | |
| JP | 1-172524 A | 7/1998 | |
| JP | 2000-158183 A | 6/2000 | |
| JP | 2005-290538 A | 10/2005 | |
| JP | 2006-183129 A | 7/2006 | |
| JP | 2006-219751 | 8/2006 | |
| JP | 2007-84841 A | 4/2007 | |
| JP | 2008-127590 | 6/2008 | |
| JP | 2010-121162 | 6/2010 | |
| RU | 2107109 C1 | 3/1998 | |
| RU | 2155821 C1 | 9/2000 | |
| RU | 2167953 C2 | 5/2001 | |
| RU | 2173729 C1 | 9/2001 | |
| RU | 2207397 C2 | 6/2003 | |
| RU | 2246554 C2 | 2/2005 | |
| RU | 2270269 C1 | 2/2006 | |
| RU | 72697 U1 | 4/2008 | |
| SU | 874761 A1 | 10/1981 | |
| SU | 1301868 A1 | 4/1987 | |
| WO | WO 87/04731 A1 | 8/1987 | |
| WO | WO 95/06142 A1 | 3/1995 | |
| WO | WO 98/10888 A1 | 3/1998 | |
| WO | WO 99/32682 A1 | 7/1999 | |
| WO | WO 00/26428 A1 | 5/2000 | |
| WO | WO 02/27056 A1 | 4/2002 | |
| WO | WO 02/086411 A1 | 11/2002 | |
| WO | WO 03/033755 A1 | 4/2003 | |
| WO | WO 03/038136 A1 | 5/2003 | |
| WO | WO 03/080886 A1 | 10/2003 | |
| WO | WO 2005/001151 A1 | 1/2005 | |
| WO | WO 2005/045082 A1 | 5/2005 | |
| WO | WO 2005/073422 A1 | 8/2005 | |
| WO | WO 2006/071192 A1 | 7/2006 | |
| WO | WO 2009/070345 A1 | 6/2009 | |
| WO | WO 2009/082498 A1 | 7/2009 | |
| WO | WO 2009/082501 A1 | 7/2009 | |
| WO | WO 2010/087766 A1 | 8/2010 | |

OTHER PUBLICATIONS

Hübler, R., et al., "Wear and corrosion protection of 316-L femoral implants by deposition of thin films," Surface and Coatings Technology, vols. 142-144, Jul. 2001, pp. 1078-1083. Accessed at http://www.sciencedirect.com/science?_ob=ArticleURL&_udi=B6TVV-43WTXCV- G&_user=10&_coverDate=_rdoc=1&_fmt=&_orig=search&_sort=d&view=c&_acct=C000050221&_version=1&_urlVersion=0&_userid=10&md5=415112522be6420c094812f0c8183ba0.

Kolukisa, S., "The effect of the process temperature on the bondability in diffusion bonding of ferritic (AISI 430) with martensitic (AISI 420) stainless steels," Praktishche Metallographie, 2006, vol. 43, No. 5, p. 252-261. PASCAL. © 2007 INIST/CNRS. Dialog® File No. 144 Accession No. 18213150.

(56) References Cited

OTHER PUBLICATIONS

Li, Ping et al., "Failure analysis of the impeller of slurry pump used in zinc hydrometallurgy process," Engineering Failure Analysis, vol. 13, Issue 6, Sep. 2006, pp. 876-885. Accessed at http://www.sciencedirect.com/science?_ob=ArticleURL&_udi=B6V2X-4H21NH4-2&_user=10&_coverDate=09%2F30%2F2006&_rdoc=1&_fmt=&_orig=search&_sort=d&view=c&_acct=C000050221&_version=1&_urlVersion=0&_userid=10&md5=401b17449fa1c06a3cf468b8915df508.

MacLeary, D.L., "Testing of Columbium and Columbium Alloys," Date Feb. 1, 1962, OSTI ID: 4810118. Journal: Corrosion; vol. 18, pp. 67t-69t. Accessed at http://www.osti.gov/energycitations/product.biblio.jsp?osti_id=4810118.

Ogawa, K., "Super duplex stainless steel and its weldability," Journal: Recent Progress in Welding Technology from the Viewpoint of Use of Stainless Steels, vol.;No.; p. 25-30(2002). Accessed at http://sciencelinks.jp/j-east/article/200306/000020030603A0127311.php.

Okamoto, H., "The Effect of Tunsten and Molybdenum on the Performance of Super Duplex Stainless Steels," Applications of Stainless Steel '92. vol. 1; Stockholm; Sweden; Jun. 9-11, 1992. pp. 360-369. 1992. Accessed at http://md1.csa.com/partners/viewrecord.php?requester=gs&collection=TRD&recid=153063WS&recid=199307351097MD&q=PREw+and+stainless+steel+-patents&uid=789942086&setcookie=yes.

Okamoto, H., et al., "A new tungsten alloyed super Duplex Stainless Steel," Sumitomo Search, No. 54, p. 21-9, Oct. 1993. INSPEC. Dialog® File No. 2 Accession No. 5652729.

Park, J.-Y., et al., "The effects of heat-treatment parameters on corrosion resistance and phase transformations of 14Cr—3Mo martensitic stainless steel" Conference: RQ12 : International Conference on Rapidly Quenched & Metastable Materials, 12, (Jeju Island KOR), Aug. 21, 2005. Materials science & engineering. A, Structural materials: properties, microstructure and processing, 2007, vol. 449-451, p. 1131-1134. PASCAL. Dialog® File No. 144 Accession No. 18102654.

Park, J.Y., et al., "Effects of austenitizing treatment on the corrosion resistance of 14Cr—3Mo martensitic stainless steel," Corrossion : (Houston, Tex.), 2006, vol. 62, No. 6, p. 541-547. PASCAL. Dialog® File No. 144 Accession No. 17993399.

Park, H.S., "A study on alloy design of duplex stainless steel. Consideration on the difference of corrosion resistance between ferrite and austenite," Journal of the Corrosion Science Society of Korea, vol. 28, No. 1, pp. 78-92. Feb. 1999. Accessed at http://md1.csa.com/partners/viewrecord.php?requester=gs&collection=TRD&recid=199910352358MD&recid=993480CO&q=PREw+and+stainless+steel+-patents&uid=789942086&setcookie=yes.

Scott, C., et al., "Microalloying with Vanadium for Improved Cold Rolled TRIP Steels," International Seminar 2005 on Application Technologies of Vanadium in Flat-Rolled Steels. Accessed at http://www.vanitec.org/pages/en/index.php.

Ueda, M., et al., "Performance of high resistant duplex stainless steel in chloride and sour environments," National Association of Corrosion Engineers, Corrosion-Resistant Alloys in Oil and Gas Production. vol. I (USA), 1996, pp. 588-608, 1996. Accessed at http://md1.csa.com/partners/viewrecord.php?requester=gs&collection=TRD&recid=199712352351MD&q=PREw+and+stainless+steel+-patents&uid=789942086&setcookie=yes.

Bergstrom, D.S., "AL 201HP (UNS S20100) alloy: a high-performance, lower-nickel alternative to 300 series alloys", ATI Allegheny Ludlum, an Allegheny Technologies Company, 2005, 8 pages.

Magee, J., "Development of Type 204 CU Stainless, A Low-Cost Alternate to Type 304", Carpenter Technology Corporation, Reading, PA, Jan. 2001. Accessed at http://crswnew.cartech.com/wnew/techarticles/TA00013.html on May 29, 2008.

Stainless Steel AL 2205 TM Alloy (UNS Designation S31803), Allegheny Ludlum, An Allegheny Teledyne Company, Technical Data Blue Sheet, Allegheny Ludlum Corporation—Pittsburgh, PA, 1998, 6 pages.

Alloys Make the Grade; "Welcome to AK Steel's Family of Stainless Steels"; "AK Steel, Stainless Steel Comparator"; "AK Steel Coated Stainless Steels"; "Glossary of Stainless Sheet and Strip Terms", AK Steel, 2000, 8 pages.

Goldschtain, M.I. et al., "Special Steels", Moscow, 'Metallurgy' Publisher, 1985, pp. 101-103 accompanied by English abstract.

J&L Specialty Steel, Inc. Commercial Products—Type 2205 (UNS 31803) Duplex Stainless Steel. [Accessed at http://www.jlspecialty.com/data/2205.htm on Aug. 8, 2001].

Dezurik, "2205 Duplex Stainless Steel", Application Data 10.60-4, Jul. 1999, 3 pages.

Duplex Stainless Steel AL 2003 TM Alloy (UNS S32003), ATI Allegheny Ludlum, Allegheny Technologies, Technical Data Blue Sheet, 2006.

ASM International, Materials Park, Ohio, Metallographer's Guide: Practices and Procedures for Irons and Steels, Chapter 1, "Introduction to Steels and Cast Irons", p. 3, 1999.

J&L Type 201, "Austenitic Manganese Stainless Steel," Alloy Digest, ASM International, Nov. 1999, 2 pages.

Stahlschlussel, "Key to Steel", 10th Edition, 1974, West Germany, 3 pages.

"Hot forming and heat treatment of duplex stainless steels", Shop Sheet, International Molybdenum Association, 1999, 100-101.

Pradhan, R., "Continuous Annealing of Steel", Heat Treating, vol. 4, ASM Handbook, ASM International, 1991, printed from http://products/asminternational.org, 3 pages.

"Forming of Stainless Steel and Heat-Resistant Alloys", ASM Handbook, ASM International, 2002, printed from http://products/asminternational.org, 2 pages.

ASM International, Materials Park, Ohio, Metallographer's Guide: Practices and Procedures for Irons and Steels, Chapter 1, "Introduction to Steels and Cast Irons", Table 1.1, p. 3, 1997.

Office Action mailed Jul. 15, 2010 in U.S. Appl. No. 12/034,183.
Office Action mailed Dec. 2, 2010 in U.S. Appl. No. 12/034,183.
Office Action mailed May 18, 2011 in U.S. Appl. No. 12/034,183.
Office Action mailed Sep. 9, 2011 in U.S. Appl. No. 12/034,183.
Notice of Allowance mailed Dec. 6, 2011 in U.S. Appl. No. 12/034,183.
Office Action mailed May 10, 2012 in U.S. Appl. No. 12/034,183.
Notice of Allowance mailed Sep. 10, 2012 in U.S. Appl. No. 12/034,183.
Office Action mailed Jul. 15, 2010 in U.S. Appl. No. 12/610,577.
Office Action mailed Dec. 2, 2010 in U.S. Appl. No. 12/610,577.
Office Action mailed May 18, 2011 in U.S. Appl. No. 12/610,577.
Office Action mailed Sep. 9, 2011 in U.S. Appl. No. 12/610,577.
Notice of Allowance mailed Dec. 1, 2011 in U.S. Appl. No. 12/610,577.
Office Action mailed May 15, 2012 in U.S. Appl. No. 12/610,577.
Notice of Allowance mailed Sep. 7, 2012 in U.S. Appl. No. 12/610,577.
Response to Rule 312 Communication mailed Oct. 29, 2012 in U.S. Appl. No. 12/610,577.
Office Action mailed Jul. 15, 2010 in U.S. Appl. No. 12/037,477.
Office Action mailed Dec. 2, 2010 in U.S. Appl. No. 12/037,477.
Office Action mailed May 18, 2011 in U.S. Appl. No. 12/037,477.
Office Action mailed Dec. 14, 2011 in U.S. Appl. No. 12/037,477.
Notice of Allowance mailed Feb. 28, 2012 in U.S. Appl. No. 12/037,477.
Office Action mailed Jul. 27, 2012 in U.S. Appl. No. 12/037,477.
Notice of Allowance mailed Sep. 10, 2012 in U.S. Appl. No. 12/037,477.
Office Action mailed Aug. 1, 2013 in U.S. Appl. No. 13/651,512.
Office Action mailed Dec. 24, 2013 in U.S. Appl. No. 13/651,512.
Notice of Allowance mailed Feb. 3, 2014 in U.S. Appl. No. 13/651,512.
Office Action mailed May 16, 2014 in U.S. Appl. No. 13/651,512.
Notice of Allowance mailed Jun. 30, 2014 in U.S. Appl. No. 13/651,512.

(56) References Cited

OTHER PUBLICATIONS

Corrected Notice of Allowability mailed Aug. 25, 2014 in U.S. Appl. No. 13/651,512.
Office Action mailed Jul. 15, 2010 in U.S. Appl. No. 12/037,199.
Office Action mailed Dec. 9, 2010 in U.S. Appl. No. 12/037,199.
Office Action mailed May 19, 2011 in U.S. Appl. No. 12/037,199.
Office Action mailed Dec. 14, 2011 in U.S. Appl. No. 12/037,199.
Office Action mailed May 10, 2012 in U.S. Appl. No. 12/037,199.
Office Action mailed Sep. 10, 2012 in U.S. Appl. No. 12/037,199.
Advisory Action mailed Nov. 13, 2012 in U.S. Appl. No. 12/037,199.
Office Action mailed May 10, 2013 in U.S. Appl. No. 12/037,199.
Office Action mailed Nov. 13, 2013 in U.S. Appl. No. 12/037,199.
Advisory Action mailed Dec. 6, 2013 in U.S. Appl. No. 12/037,199.
Office Action mailed Mar. 7, 2014 in U.S. Appl. No. 12/037,199.
Office Action mailed May 15, 2014 in U.S. Appl. No. 12/037,199.
Advisory Action mailed Jun. 13, 2014 in U.S. Appl. No. 12/037,199.
Notice of Allowance mailed Aug. 26, 2014 in U.S. Appl. No. 12/037,199.
Office Action mailed May 29, 2014 in U.S. Appl. No. 13/683,084.
Office Action mailed Jul. 16, 2014 in U.S. Appl. No. 13/683,084.
Advisory Action mailed Oct. 8, 2014 in U.S. Appl. No. 13/683,084.
Office Action mailed Nov. 6, 2014 in U.S. Appl. No. 13/683,084.
Office Action mailed Jan. 5, 2015 in U.S. Appl. No. 13/683,084.
Advisory Action mailed Mar. 5, 2015 in U.S. Appl. No. 13/683,084.
Notice of Allowance mailed May 1, 2015 in U.S. Appl. No. 13/683,084.
Office Action mailed May 29, 2014 in U.S. Appl. No. 13/681,445.
Office Action mailed Jul. 16, 2014 in U.S. Appl. No. 13/681,445.
Advisory Action mailed Aug. 26, 2014 in U.S. Appl. No. 13/681,445.
Office Action mailed Nov. 6, 2014 in U.S. Appl. No. 13/681,445.
Office Action mailed Dec. 31, 2014 in U.S. Appl. No. 13/681,445.
Advisory Action mailed Mar. 5, 2015 in U.S. Appl. No. 13/681,445.
Notice of Allowance mailed Apr. 24, 2015 in U.S. Appl. No. 13/681,445.
U.S. Appl. No. 14/818,852, filed Aug. 5, 2015.
Keown, S.R., "Boron in Steel", Scan. J. Metallurgy, 2, 1973, pp. 59-63.
Hertzman et al., "Influence of B and D on austenite reformation in duplex stainless steels", Swedish Institute for Metals Research, IM-200-065, Dec. 2000, 30 pages.
Tsuge, S., "Effects of Impurity and Microalloying Elements on Hot Workability of Duplex Stainless Steels", Proceeding of International Conference on Stainless Steels, Jun. 1991, vol. 2, Chiba, Japan, pp. 799-806.
Office Action mailed Jun. 17, 2016 in U.S. Appl. No. 14/456,026.
Office Action mailed Jun. 21, 2016 in U.S. Appl. No. 14/818,852.
"Stainless Steels Chromium-Nickel-Molybdenum Types 316 (S31600), 316L (S31603), 317 (S31700), 317L (S31703)", ATI Allegheny Ludlum Allegheny Technologies, Technical Data Blue Sheet, 2006, pp. 1-13.
Stainless Steels Chromium-Nickel Types 302 (S30200), 304(S30400), 304L (S30403), 305 (S30500), Allegheny Ludlum an Allegheny Technologies Company, Technical Data Blue Sheet, Allegheny Ludlum Corporation—Pittsburgh, PA, 1998, pp. 1-10.
"Stainless Steels Types 201 and 201L (UNS Designations S20100 and S20103)", ATI Allegheny Ludlum Allegheny Technologies, Technical Data Blue Sheet, 2005, pp. 1-8.
"Twice the yield strength of 304 stainless with comparable corrosion resistance. Low magnetic permeability retained after severe cold working. Resistance to chloride stress corrosion cracking superior to 304. Excellent strength and ductility at cryogenic temperatures. Wear and galling resistance superior to the standard austenitic grades", Carlson Alloy Nitronic 33 (ASTM XM-29, UNS S24000), Product Data Bulletin Nitronic 33, 1998, 4 pages.
"Nitrogen-strengthened austenitic stainless steel providing good aqueous corrosion resistance combined with resistance to abrasives and metal-to-metal wear. Higher mechanical properties than standard austenitic grades. Outstanding corrosive wear resistance under many different sliding conditions. Galling resistance equivalent to 304", Carlson Alloy Nitronic 33 (UNS S20400), Product Data Bulletin Nitronic 30, 1998, 2 pages.
Dr. Jacques Charles, "The New 200-Series: An Alternative Answer to NI. Surcharge? Dream or Nightmare?", U & A, Arcelor, Immeuble Pacific-11,13 cours Valmy F-92070 La Defense cedex., Sep. 27-30, 2005, pp. 1-9.
"Stainless Steel Chromium-Nickel-Manganese AL 201LN (UNS Designation S20153)", Allegheny Ludlum—An Allegheny Teledyne Company, Technical Data Blue Sheet, Allegheny Ludlum Corporation, 1998, pp. 1-5.
Allegheny Ludlum Stainless Steel, Type 301 (UNS Designation S30100), Allegheny Ludlum—An Allegheny Technologies Company, Technical Data Blue Sheet, Allegheny Ludlum Corporation, Pittsburgh, PA, 1998, pp. 1-6.
"Stainless Steel J216L—an Alternative to 316L", Jindal Stainless, pp. 1-5.
Yasuhiro Habara, "IMnI 30th Annual Conference 2004—Stainless Steel 200 Series: An Opportunity for Mn", Nippon Metal Industry, Co., Ltd., Mar. 2005, 24 pages.
"200 Series; Merits of 200 series, JSL grades; JSL AUS (201 Modified); Typical Applications for JSL AUS (201 Modified); J201 (UNS S20100); Typical Applications for J201 (UNS S20100); J4 (S20430 Modified); Typical Applications for J4 (S20430 Modified); J204Cu (UNS S20430); Typical Applications for J204Cu (UNS S20430); Chemistry; Mechanical Properties; Corrosion in Various Food Application Media; Manufacturing Range", Jindal Stainless, 15 pages.
Bridges, W.H., ed., "Metallurgy Division Quarterly Progress Report for Period Ending Oct. 31, 1952," Technical Report, OSTI ID: 4176086, Oak Ridge National Lab., Tenn. Accessed at http://www.osti.gov/energycitations/product.biblio.jsp?osti_id=4176086.
Office Action dated Sep. 22, 2016 in U.S. Appl. No. 14/456,026.
Notice of Allowance dated Nov. 10, 2016 in U.S. Appl. No. 14/456,026.
Corrected Notice of Allowability dated Feb. 16, 2017 in U.S. Appl. No. 14/456,026.
Office Action dated Oct. 14, 2016 in U.S. Appl. No. 14/318,352,.
Notice of Allowance dated Feb. 2, 2017 in U.S. Appl, No, 14/818,352.
Office Action dated Jun. 27, 2016 in U.S. Appl. No. 14/497,747.
Notice of Allowance dated Dec. 30, 2016 in U.S. Appl. No. 14/497,747.
U.S. Appl. No. 15/427,667, filed Feb. 8, 2017.
U.S. Appl. No. 15/446,467, filed Mar. 1, 2017.

\* cited by examiner

LEAN AUSTENITIC STAINLESS STEEL CONTAINING STABILIZING ELEMENTS

CROSS-REFERENCE TO RELATED APPLICATIONS

This application is a continuation application claiming priority under 35 U.S.C. § 120 to U.S. patent application Ser. No. 13/683,084, filed Nov. 21, 2012 issued as U.S. Pat. No. 9,133,538, which in turn is a continuation application claiming priority under 35 U.S.C. § 120 to U.S. patent application Ser. No. 12/034,183, issued as U.S. Pat. No. 8,337,748, which in turn claims priority to U.S. Provisional Patent Application Ser. No. 61/015,264, filed Dec. 20, 2007.

BACKGROUND

Field of Technology

The present disclosure relates to an austenitic stainless steel. In particular, the disclosure relates to a cost-effective stabilized austenitic stainless steel composition including low nickel and molybdenum levels, improved high temperature properties and at least comparable corrosion resistance and formability properties relative to higher nickel alloys.

Description of the Background of the Technology

Austenitic stainless steels exhibit a combination of highly desirable properties that make them useful for a wide variety of industrial applications. These steels possess a base composition of iron that is balanced by the addition of austenite-promoting and stabilizing elements, such as nickel, manganese, and nitrogen, to allow additions of ferrite-promoting elements, such as chromium and molybdenum, which enhance corrosion resistance, to be made while maintaining an austenitic structure at room temperature. The austenitic structure provides the steel with highly desirable mechanical properties, particularly toughness, ductility, and formability.

A specific example of an austenitic stainless steel is AISI Type 316 stainless steel (UNS S31600), which is a 16-18% chromium, 10-14% nickel, and 2-3% molybdenum-containing alloy. The ranges of alloying ingredients in this alloy are maintained within the ranges specified in order to maintain a stable austenitic structure. As is understood by one skilled in the art, nickel, manganese, copper, and nitrogen contents, for example, contribute to the stability of the austenitic structure. However, the rising costs of nickel and molybdenum have created the need for cost-effective alternatives to S31600 which still exhibit high corrosion resistance and good formability.

Another alloy alternative is Grade 216 (UNS S21600), which is described in U.S. Pat. No. 3,171,738. S21600 contains 17.5-22% chromium, 5-7% nickel, 7.5-9% manganese, and 2-3% molybdenum. Although S21600 is a lower nickel, higher manganese variant of S31600, the strength and corrosion resistance properties of S21600 are much higher than those of S31600. However, as with the duplex alloys, the formability of S21600 is not as good as that of S31600. Also, because S21600 contains the same amount of molybdenum as does S31600, there is no cost savings for molybdenum.

A variant of S31600 also exists which is primarily intended for use at high temperatures. This alloy is designated as Type 316Ti (UNS S31635). The significant difference between S31600 and S31635 is the presence of a small addition of titanium balanced to the amount of carbon and nitrogen present in the steel. The resulting steel, S31635, is less prone to the deleterious formation of chromium carbides at elevated temperatures and during welding, a phenomenon known as sensitization. Such additions can also enhance elevated temperature properties due to the strengthening effects of primary and secondary carbide formation. The specified range for titanium in S31635 is given by the following equation:

$$[5\times(\% \ C + \% \ N)] \leq Ti \leq 0.70\%$$

However, S31635 uses costly raw material.

Other examples of alloys include numerous stainless steels in which nickel is replaced with manganese to maintain an austenitic structure, such as is practiced with Type 201 steel (UNS S20100) and similar grades. However, there is a need to be able to produce an alloy having a combination of improved elevated temperature properties similar to S31635 and both corrosion resistance and formability properties similar to S31600, while containing a lower amount of nickel and molybdenum so as to be cost-effective. In particular, there is a need for such an alloy to have, unlike duplex alloys, a temperature application range comparable to that of standard austenitic stainless steels, for example from cryogenic temperatures up to 1300° F.

Accordingly, the present invention provides a solution that is not currently available in the marketplace, which is a formable stabilized austenitic stainless steel alloy composition that has comparable corrosion resistance properties and improved elevated temperature properties to S31600 and S31635, while providing raw material cost savings. Accordingly, the invention is a stabilized austenitic alloy that uses controlled levels of carbide-forming elements to improve elevated temperature properties. The austenitic alloy also utilizes a combination of the elements Mn, Cu, and N, to replace Ni and Mo in a manner to create an alloy with similar properties to those of higher nickel and molybdenum alloys at a significantly lower raw material cost. Optionally, the elements W and Co may be used independently or in combination to replace the elements Mo and Ni, respectively.

SUMMARY

The invention is an austenitic stainless steel that uses carbide-forming elements and less expensive elements, such as manganese, copper, and nitrogen, as substitutes for the more costly elements of nickel and molybdenum. The result is a lower cost alloy that has improved elevated temperature properties and corrosion resistance and formability properties at least comparable to more costly alloys, such as S31600 and S31635. The alloy is light gauge and has a clean microstructure with relatively fine grains for formability.

An embodiment of the invention is an austenitic stainless steel including, in weight %, up to 0.20 C, 2.0-9.0 Mn, up to 2.0 Si, 16.0-23.0 Cr, 1.0-7.0 Ni, up to 3.0 Mo, up to 3.0 Cu, 0.05-0.35 N, (7.5 (% C))≤(Nb+Ti+V+Ta+Zr)≤1.5, up to 4.0 W, up to 0.01 B, up to 1.0 Co, iron and impurities. Certain non-limiting embodiments of the austenitic stainless steel include tungsten such that 0.5≤(Mo+W/2)≤5.0. Certain embodiments of the austenitic stainless steel may include cobalt such that 1.0≤(Ni+Co)≤8.0. Certain embodiments of the austenitic stainless steel may include at least 0.1% niobium, or may include niobium in a concentration of at least (7.5 (% C)).

Another embodiment of the invention is an austenitic stainless steel, including in weight %, up to 0.10 C, 2.0-8.0 Mn, up to 1.00 Si, 16.0-22.0 Cr, 1.0-7.0 Ni, 0.40-2.0 Mo, up to 1.00 Cu, 0.08-0.30 N, (7.5 (% C))≤(Nb+Ti+V+Ta+Zr)≤1.5, 0.05-0.60 W, up to 1.0 Co, up to 0.040 P, up to 0.030 S, and up to 0.008 B, iron and impurities. Certain embodiments of the austenitic stainless steel may include tungsten such that $0.5 \leq (Mo+W/2) \leq 2.3$. Certain embodiments of the austenitic stainless steel may include cobalt such that $1.0 \leq (Ni+Co) \leq 8.0$. Certain embodiments of the austenitic stainless steel may include at least 0.1% niobium, or may include niobium in a concentration of at least (7.5 (% C)).

In an alternative embodiment of the present invention, an austenitic stainless steel includes, in weight %, up to 0.08 C, 3.5-6.5 Mn, up to 1.00 Si, 17.0-21.0 Cr, 0.5-2.0 Mo, 4.0-6.5 Ni, 0.08-0.30 N, $(7.5 (\% C)) \leq (Nb+Ti+V+Ta+Zr) \leq 1.0$, up to 1.0 Cu, up to 0.050 P, up to 0.030 S, iron and impurities. Certain embodiments of the austenitic stainless steel may include tungsten such that $0.5 \leq (Mo+W/2) \leq 4.0$. Certain embodiments of the austenitic stainless steel may include cobalt such that $4.0 \leq (Ni+Co) \leq 7.5$. Certain embodiments of the austenitic stainless steel may include at least 0.1% niobium, or may include niobium in a concentration of at least (7.5 (% C)).

The austenitic stainless steel of the present invention has a $PRE_W$ value greater than about 22, a ferrite number less than about 10, and an $MD_{30}$ value of less than about 20° C.

One method of producing the stainless steel is by melting in an electric arc furnace, refining in an AOD, casting into ingots or continuously cast slabs, reheating the ingots or slabs and hot rolling them to produce plates or coils, cold rolling coils to a specified thickness, and annealing and pickling the material. Other methods of producing the invented material may also be used, including melting and/or re-melting in a vacuum or under a special atmosphere, casting into shapes, or the production of a powder that is consolidated into slabs or shapes.

Alloys according to the present disclosure may be used in numerous applications. According to one example, alloys of the present disclosure may be included in articles of manufacture adapted for use in low temperature or cryogenic environments. Additional non-limiting examples of articles of manufacture that may be fabricated from or include the present alloys are flexible connectors for automotive and other applications, bellows, flexible pipe, chimney liners, and flue liners.

DETAILED DESCRIPTION

In the present description and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the product and methods according to the present disclosure. At the very least, and not as an attempt to limit the application of the doctrine of equivalents to the scope of the claims, each numerical parameter should at least be construed in light of the number of reported significant digits and by applying ordinary rounding techniques. The austenitic stainless steels of the present invention will now be described in detail. In the following description, "%" represents "weight %", unless otherwise specified.

The invention is directed to an austenitic stainless steel. In particular, the invention is directed to a stabilized austenitic stainless steel composition that has at least comparable corrosion resistance and formability properties and improved elevated temperature properties relative to those of S31635 and the like. The austenitic stainless steel composition may include, in weight %, up to 0.20 C, 2.0-9.0 Mn, up to 2.0 Si, 16.0-23.0 Cr, 1.0-7.0 Ni, up to 3.0 Mo, up to 3.0 Cu, 0.05-0.35 N, $(7.5 (\% C)) \leq (Nb+Ti+V+Ta+Zr) \leq 1.5$, up to 4.0 W, up to 0.01 B, up to 1.0 Co, iron and impurities. Certain embodiments of the austenitic stainless steel may include at least 0.1% niobium, or may include niobium in a concentration of at least (7.5 (% C)).

In an alternative embodiment, an austenitic stainless steel composition may include, in weight %, up to 0.20 C, 2.0-9.0 Mn, up to 2.0 Si, 16.0-23.0 Cr, 1.0-7.0 Ni, up to 3.0 Mo, up to 3.0 Cu, 0.05-0.35 N, $(7.5 (\% C)) \leq (Nb+Ti+V+Ta+Zr) \leq 1.5$, up to 0.01 B, tungsten, iron and impurities, such that $0.5 \leq (Mo+W/2) \leq 5.0$ and $1.0 \leq (Ni+Co) \leq 8.0$. Certain embodiments of the austenitic stainless steel may include at least 0.1% niobium, or may include niobium in a concentration of at least (7.5 (% C)).

Another embodiment of the invention is an austenitic stainless steel, including, in weight %, up to 0.10 C, 2.0-8.0 Mn, up to 1.00 Si, 16.0-22.0 Cr, 1.0-7.0 Ni, 0.40-2.0 Mo, up to 1.00 Cu, 0.08-0.30 N, $(7.5 (\% C)) \leq (Nb+Ti+V+Ta+Zr) \leq 1.5$, 0.05-0.60 W, up to 1.0 Co, up to 0.040 P, up to 0.030 S, and up to 0.008 B, iron and impurities. Certain embodiments of the austenitic stainless steel may include tungsten such that $0.5 \leq (Mo+W/2) \leq 2.3$. Certain embodiments of the austenitic stainless steel may include cobalt such that $1.0 \leq (Ni+Co) \leq 8.0$. Certain embodiments of the austenitic stainless steel may include at least 0.1% niobium, or may include niobium in a concentration of at least (7.5 (% C)).

In an alternative embodiment of the present invention, an austenitic stainless steel includes, in weight %, up to 0.08 C, 3.5-6.5 Mn, up to 1.00 Si, 17.0-21.0 Cr, 0.5-2.0 Mo, 4.0-6.5 Ni, 0.08-0.30 N, $(7.5 (\% C)) \leq (Nb+Ti+V+Ta+Zr) \leq 1.0$, up to 1.0 Cu, up to 0.050 P, up to 0.030 S, iron and impurities. Certain embodiments of the austenitic stainless steel may include tungsten such that $0.5 \leq (Mo+W/2) \leq 4.0$. Certain embodiments of the austenitic stainless steel may include cobalt such that $4.0 \leq (Ni+Co) \leq 7.5$. Certain embodiments of the austenitic stainless steel may include at least 0.1% niobium, or may include niobium in a concentration of at least (7.5 (% C)).

C: Up to 0.20%

C acts to stabilize the austenite phase and inhibits the deformation-induced martensitic transformation. However, C also increases the probability of forming chromium carbides, especially during welding, which reduces corrosion resistance and toughness. Accordingly, the austenitic stainless steel of the present invention has up to 0.20% C. In an embodiment of the invention, the content of C may be 0.10% or less. Alternatively, the content of C may be 0.08% or less, or may be 0.03% or less.

Si: Up to 2.0%

Having greater than 2% Si promotes the formation of embrittling phases, such as sigma, and reduces the solubility of nitrogen in the alloy. Si also stabilizes the ferritic phase, and greater than 2% Si requires additional austenite stabilizers to maintain the austenitic phase. Accordingly, the austenitic stainless steel of the present invention has up to 2.0% Si. In an embodiment of the invention, the Si content may be 1.0% or less. Si helps to minimize the reactivity of certain alloying elements with niobium and assists with phase balance in the alloy. In certain embodiments, the effects of Si addition are balanced by adjusting the Si content to 0.5-1.0%.

Mn: 2.0-9.0%

Mn stabilizes the austenitic phase and generally increases the solubility of nitrogen, a beneficial alloying element. To sufficiently produce these effects, a Mn content of not less than 2.0% is required. Both manganese and nitrogen are effective substitutes for the more expensive element, nickel. However, having greater than 9.0% Mn degrades the material's workability and its corrosion resistance in certain environments. Also, because of the difficulty in decarburizing stainless steels with high levels of Mn, such as greater than 9.0%, high Mn levels significantly increase the processing costs of manufacturing the material. Accordingly, in order to properly balance the corrosion resistance, phase balance, ductility and other mechanical properties in the austenitic stainless steel of the present invention, the Mn level is set at 2.0-9.0%. In an embodiment, the Mn content may be 2.0-8.0%, or alternatively may be 3.5-6.5%.

Ni: 1.0-7.0%

At least 1% Ni is required to stabilize the austenitic phase with respect to both ferrite and martensite formation. Ni also acts to enhance toughness and formability. However, due to the relatively high cost of nickel, it is desirable to keep the nickel content as low as possible. Although Mn and N may be partial substitutes for Ni, high levels of Mn and N will result in unacceptable levels of work hardening, reducing formability. Therefore, the alloy must include a minimum concentration of Ni to provide for acceptable formability. The inventors have found that 1.0-7.0% range of Ni can be used in addition to the other defined ranges of elements to achieve an alloy having corrosion resistance and formability as good as or better than those of higher nickel alloys. Accordingly, the austenitic stainless steel of the present invention has 1.0-7.0% Ni. In an embodiment, the Ni content may be 4.0-6.5%.

Cr: 16.0-23.0%

Cr is added to impart corrosion resistance to stainless steels by forming a passive film on the alloy surface. Cr also acts to stabilize the austenitic phase with respect to martensitic transformation. At least 16% Cr is required to provide adequate corrosion resistance. On the other hand, because Cr is a powerful ferrite stabilizer, a Cr content exceeding 23% requires the addition of more costly alloying elements, such as nickel or cobalt, to keep the ferrite content acceptably low. Having more than 23% Cr also makes the formation of undesirable phases, such as sigma, more likely. Accordingly, the austenitic stainless steel of the present invention has 16.0-23.0% Cr. In an embodiment, the Cr content may be 16.0-22.0%, or alternatively may be 17.0-21.0%.

N: 0.05-0.35%

N is included in the present alloy as a partial replacement for the austenite stabilizing element Ni and the corrosion resistance enhancing element Mo. N also improves alloy strength. At least 0.05% N is necessary for strength and corrosion resistance and to stabilize the austenitic phase. The addition of more than 0.35% N may exceed the solubility of N during melting and welding, which results in porosity due to nitrogen gas bubbles. Even if the solubility limit is not exceeded, a N content of greater than 0.35% increases the propensity for the precipitation of nitride particles, which degrades corrosion resistance and toughness. The present inventors have determined that a N content up to 0.35% is compatible with the Nb levels in the alloy, without the formation of a problematic level of niobium carbonitride precipitates. Accordingly, the austenitic stainless steel of the present invention has 0.05-0.35% N. In an embodiment, the N content may be 0.08-0.30%.

Mo: Up to 3.0%

The present inventors sought to limit the Mo content of the alloy while maintaining acceptable properties. Mo is effective in stabilizing the passive oxide film that forms on the surface of stainless steels and protects against pitting corrosion by the action of chlorides. In order to obtain these effects, Mo may be added in this invention up to a level of 3.0%. Due to its cost, the Mo content may be 0.5-2.0%, which is adequate to provide the required corrosion resistance in combination with the proper amounts of chromium and nitrogen. A Mo content exceeding 3.0% causes deterioration of hot workability by increasing the fraction of solidification ferrite to potentially detrimental levels. High Mo content also increases the likelihood of forming deleterious intermetallic phases, such as sigma phase. Accordingly, the austenitic stainless steel composition of the present invention has up to 3.0% Mo. In an embodiment, the Mo content may be about 0.40-2.0%, or alternatively may be 0.50-2.0%.

Co: Up to 1.0%

Co acts as a substitute for nickel to stabilize the austenite phase. The addition of cobalt also acts to increase the strength of the material. The upper limit of cobalt is preferably 1.0%.

B: Up to 0.01%

Additions as low as 0.0005% B may be added to improve the hot workability and surface quality of stainless steels. However, additions of more than 0.01% degrades the corrosion resistance and workability of the alloy. Accordingly, the austenitic stainless steel composition of the present invention has up to 0.01% B. In an embodiment, the B content may be up to 0.008%, or may be up to 0.005%.

Cu: Up to 3.0%

Cu is an austenite stabilizer and may be used to replace a portion of the nickel in this alloy. It also improves corrosion resistance in reducing environments and improves formability by reducing the stacking fault energy. However, additions of more than 3% Cu have been shown to reduce the hot workability of austenitic stainless steels. Accordingly, the austenitic stainless steel composition of the present invention has up to 3.0% Cu. In an embodiment, Cu content may be up to 1.0%.

W: Up to 4.0%

W provides a similar effect to that of molybdenum in improving resistance to chloride pitting and crevice corrosion. W may also reduce tendency for sigma phase formation when substituted for molybdenum. However, additions of more than 4% may reduce the hot workability of the alloy. Accordingly, the austenitic stainless steel composition of the present invention has up to 4.0% W. In an embodiment, W content may be 0.05-0.60%.

$0.5 \leq (Mo+W/2) \leq 5.0$

Molybdenum and tungsten are both effective in stabilizing the passive oxide film that forms on the surface of stainless steels and protects against pitting corrosion by the action of chlorides. Since W is approximately half as effective (by weight) as Mo in increasing corrosion resistance, a combination of $(Mo+W/2)>0.5\%$ is required to provide the necessary corrosion resistance. However, having too much Mo increases the likelihood of forming intermetallic phases and too much W reduces the hot workability of the material. Therefore, the combination of $(Mo+W/2)$ is preferably less than 5%. In an embodiment, molybdenum and tungsten may be present such that $0.5 \leq (Mo+W/2) \leq 2.3$, or alternatively such that $0.5 \leq (Mo+W/2) \leq 4.0$.

$1.0 \leq (Ni+Co) \leq 8.0$

Nickel and cobalt both act to stabilize the austenitic phase with respect to ferrite formation. At least 1% (Ni+Co) is required to stabilize the austenitic phase in the presence of ferrite stabilizing elements such as Cr and Mo, which must be added to ensure proper corrosion resistance. However, both Ni and Co are costly elements, so it is desirable to keep the (Ni+Co) content less than 8%. In an embodiment, the (Ni+Co) content may be greater than 4.0% but less than 7.5%.

$(7.5 (\% C)) \leq (Nb+Ti+V+Ta+Zr) \leq 1.5$

Nb reacts with carbon, and to a lesser extent nitrogen, to form carbides and carbonitrides in the form of small particles. These particles effectively prevent the formation of deleterious chromium carbides during elevated temperature service and during welding, which improves the room temperature corrosion resistance. These particles, when produced using an effective heat treatment, can also improve elevated temperature strength and creep resistance. A minimum addition of (7.5×% C) provides for one atom of Nb for every one atom of C present dissolved in the metal. Higher levels of Nb will consume beneficial N, so it is desirable to keep the Nb content less than 1.5%. Other elements which form stable carbides, including but not limited to Ti, V, Ta, and Zr may be added in substitution for niobium. However, such substitutes react more strongly with N than Nb and therefore are controlled to provide a beneficial effect, such as improved weldabilty. The inventors have determined that the sum of the weight percentages of Nb, Ti, V, Ta, and Zr should be maintained in the range of (7.5 (% C)) up to 1.5%. Stated differently, $(7.5 (\% C)) \leq (Nb+Ti+V+Ta+Zr) \leq 1.5\%$. In certain embodiments, $(7.5 (\% C)) \leq (Nb+Ti+V+Ta+Zr) \leq 1.0\%$. In certain preferred embodiments, the alloy includes at least 0.1% Nb, and the sum of the weight percentages of Nb, Ti, V, Ta, and Zr is in the range of (7.5 (% C)) up to 1.5% or 1.0%. In certain embodiments, Ti, V, Ta, and Zr are present only as incidental impurities or are maintained at levels as low as practical. In certain embodiments, in order to optimize the room temperature corrosion resistance, elevated temperature strength, creep resistance, and weldabilty properties of the alloy, certain embodiments of the alloy include a Nb content of at least (7.5 (% C)), and Ti, V, Ta, and Zr are present only as incidental impurities. The present inventors have determined that a Nb content up to 1.5% is compatible with the alloy's N content of 0.05-0.35% in that the combination does not result in a level of niobium carbonitride precipitates that unacceptably degrades creep resistance.

The balance of the stabilized austenitic stainless steel of the present invention includes iron and unavoidable impurities, such as phosphorus and sulfur. The unavoidable impurities are preferably kept to the lowest practical and economically justifiable level, as understood by one skilled in the art.

Elements that form very stable nitrides, such as Al, should be kept to low levels.

The stabilized austenitic stainless steel of the present invention can also be defined by equations that quantify the properties they exhibit, including, for example, pitting resistance equivalence number, ferrite number, and $MD_{30}$ temperature.

The pitting resistance equivalence number ($PRE_N$) provides a relative ranking of an alloy's expected resistance to pitting corrosion in a chloride-containing environment. The higher the $PRE_N$, the better the expected corrosion resistance of the alloy. The $PRE_N$ can be calculated by the following formula:

$$PRE_N = \% Cr + 3.3(\% Mo) + 16(\% N)$$

Alternatively, a factor of 1.65 (% W) can be added to the above formula to take into account the presence of tungsten in an alloy. Tungsten improves the pitting resistance of stainless steels and is about half as effective as molybdenum by weight. When tungsten is included in the calculation, the pitting resistance equivalence number is designated as $PRE_W$, which is calculated by the following formula:

$$PRE_W = \% Cr + 3.3(\% Mo) + 1.65(\% W) + 16(\% N)$$

Tungsten serves a similar purpose as molybdenum in the invented alloy. As such, tungsten may be added as a substitute for molybdenum to provide increased pitting resistance. According to the equation, twice the weight percent of tungsten should be added for every percent of molybdenum removed to maintain the same pitting resistance. The alloy of the present invention has a $PRE_W$ value of greater than 22, preferably as high as 30.

The alloy of the invention also may be defined by its ferrite number. A positive ferrite number generally correlates to the presence of ferrite, which improves an alloy's solidification properties and helps to inhibit hot cracking of the alloy during hot working and welding operations. A small amount of ferrite is thus desired in the initial solidified microstructure for good castability and for prevention of hot-cracking during welding. On the other hand, too much ferrite can result in problems during service, including but not limited to, microstructural instability, limited ductility, and impaired high temperature mechanical properties. The ferrite number can be calculated using the following equation:

$$FN = 3.34(Cr+1.5Si+Mo+2Ti+0.5Cb) - 2.46(Ni+30N+30C+0.5Mn+0.5Cu) - 28.6$$

The alloy of the present invention has a ferrite number of up to 10, preferably a positive number, more preferably about 3 to 5.

The $MD_{30}$ temperature of an alloy is defined as the temperature at which cold deformation of 30% will result in a transformation of 50% of the austenite to martensite. The lower the $MD_{30}$ temperature is, the more resistant a material is to martensite transformation. Resistance to martensite formation results in a lower work hardening rate, which results in good formability, especially in drawing applications. $MD_{30}$ is calculated according to the following equation:

$$MD_{30}(^\circ C.) = 413 - 462(C+N) - 9.2Si - 8.1Mn - 13.7Cr - 9.5Ni - 17.1Cu - 18.5Mo$$

The alloy of the present invention has a $MD_{30}$ temperature of less than 20° C., preferably less than about −10° C.

EXAMPLES

Table 1 includes the compositions and calculated parameter values for Inventive Alloys 1-5 and Comparative Alloys S31600, S31635, S21600, and S20100.

Inventive Alloys 1-5 were melted in a laboratory-size vacuum furnace and poured into 50-lb ingots. These ingots were re-heated and hot rolled to produce material about 0.250" thick. This material was annealed, blasted, and pickled. Some of that material was cold rolled to 0.100"-thick, and the remainder was cold rolled to 0.050 or 0.040"-thick. The cold rolled material was annealed and pickled. Comparative Alloys S31600, S31635, S21600, and S20100 are commercially available and the data shown for these alloys were taken from published literature or measured from testing of material recently produced for commercial sale.

The calculated $PRE_W$ values for each alloy are shown in Table 1. Using the equation discussed herein above, the alloys having a $PRE_W$ greater than 24.0 would be expected to have better resistance to chloride pitting than Comparative Alloy S31635 material, while those having a lower $PRE_W$ would pit more easily.

The ferrite number for each alloy in Table 1 has also been calculated. The ferrite number for each of Inventive Alloys 1-5 is in the preferred range of less than 10.

The $MD_{30}$ values were also calculated for the alloys in Table 1. According to the calculations, Inventive Alloys 1-5, particularly Inventive Alloys 4 and 5, exhibit similar resistance to martensite formation to Comparative Alloys S31600 and S31635.

TABLE 1

|   | Inventive Alloys | | | | | Comparative Alloys | | | |
|---|---|---|---|---|---|---|---|---|---|
|   | 1 | 2 | 3 | 4 | 5 | S31600 | S31635 | S21600 | S20100 |
| C | 0.017 | 0.015 | 0.014 | 0.014 | 0.016 | 0.017 | 0.016 | 0.018 | 0.02 |
| Mn | 4.7 | 4.8 | 4.7 | 5.1 | 4.9 | 1.24 | 1.81 | 8.3 | 6.7 |
| Si | 0.26 | 0.27 | 0.28 | 0.29 | 0.3 | 0.45 | 0.50 | 0.40 | 0.40 |
| Cr | 16.6 | 16.6 | 16.6 | 18.1 | 18.2 | 16.3 | 16.8 | 19.7 | 16.4 |
| Ni | 5.2 | 5.2 | 5.2 | 5.5 | 5.5 | 10.1 | 10.7 | 6.0 | 4.1 |
| Mo | 1.47 | 1.47 | 1.47 | 1.00 | 1.1 | 2.1 | 2.11 | 2.5 | 0.26 |
| Cu | 0.40 | 0.40 | 0.39 | 0.40 | 0.5 | 0.38 | 0.36 | 0.40 | 0.43 |
| N | 0.075 | 0.104 | 0.081 | 0.129 | 0.170 | 0.04 | 0.013 | 0.37 | 0.15 |
| P | 0.011 | 0.012 | 0.012 | 0.014 | 0.014 | 0.03 | 0.031 | 0.03 | 0.03 |
| S | 0.0010 | 0.0012 | 0.0012 | 0.0016 | 0.0016 | 0.0010 | 0.0004 | 0.0010 | 0.0010 |
| W | 0.10 | 0.10 | 0.09 | 0.04 | 0.09 | 0.11 | 0.10 | 0.10 | 0.1 |
| B | 0.0019 | 0.0018 | 0.0016 | 0.0022 | 0.0022 | 0.0025 | 0.0025 | 0.0025 | 0.0005 |
| Fe | Bal. | Bal. | Bal. | Bal. | Bal. | Bal. | Bal. | Bal. | Bal. |
| Cb | 0.710 | 0.498 | 0.288 | 0.500 | 0.26 | 0.35 | 0.02 | 0.10 | 0.10 |
| Co | 0.22 | 0.19 | 0.15 | 0.19 | 0.15 | — | — | — | — |
| Ti | — | — | — | — | — | — | 0.22 | — | — |
| FN | 8.3 | 5.8 | 7.5 | 6.6 | 3.7 | 4.1 | 6.7 | −6.2 | −2.3 |
| $PRE_W$ | 22.9 | 23.4 | 23.1 | 23.6 | 24.7 | 24.0 | 24.0 | 33.9 | 19.7 |
| $MD_{30}$ | 19.3 | 6.6 | 17.2 | −22.2 | −46.2 | −63 | −72.4 | −217.4 | 0.7 |
| RMCI | 0.63 | 0.63 | 0.62 | 0.59 | 0.60 | 0.96 | 1.00 | 0.80 | 0.41 |
| Yield | 47.0 | 47.0 | 46.1 | 48.4 | 53.7 | 43.5 | 41.5 | 55 | 43 |
| Tensile | 102.0 | 105.5 | 104.5 | 105.9 | 106.4 | 90.6 | 92.0 | 100 | 100 |
| % E | 43 | 49 | 48 | 41 | 49 | 56 | 67 | 45 | 56 |
| OCH | 0.42 | 0.39 | 0.40 | 0.41 | 0.43 | 0.45 | — | — | — |

Table 1 also shows a raw material cost index (RMCI), which compares the material costs for each alloy to that of Comparative Alloy S31635. The RMCI was calculated by multiplying the average October 2007 cost for the raw materials Fe, Cr, Mn, Ni, Mo, W, and Co by the percent of each element contained in the alloy and dividing by the cost of the raw materials in Comparative Alloy S31635. As the calculated values show, Inventive Alloys 1-5 has an RMCI of less than 0.65, which means the cost of the raw materials contained therein are less than 65% of those in Comparative Alloy S31635. That a material could be made that has similar properties to Comparative Alloy S31635 at a significantly lower raw material cost is surprising and was not anticipated from the prior art.

The mechanical properties of Inventive Alloys 1-5 have been measured and compared to those commercially available Comparative Alloys S31600, S31635, S21600, and S20100. The measured yield strength, tensile strength, percent elongation over a 2-inch gage length, and Olsen cup height are shown in Table 1. The tensile tests were conducted on 0.100" gage material, the Charpy tests were conducted on 0.197" thick samples, and the Olsen cup tests were run on material between 0.040- and 0.050-inch thick. All tests were performed at room temperature. Units for the data in Table 1 are as follows: yield strength and tensile strength, ksi; elongation, percent; Olsen cup height, inches. As can be seen from the data, the Inventive Alloys, and in particular Inventive Alloys 4 and 5, exhibited comparable properties to those of the commercially available S31635 material. The Inventive Alloys, however, included less than half the concentration of nickel and also significantly less molybdenum than in Comparative Alloy S31635. The significantly lower concentration of the costly alloying elements nickel and molybdenum is such that the RMCI of Comparative Alloys 4 and 5 at least 40% less than for Comparative Alloy S31635. Despite their substantially reduced levels of nickel and molybdenum, however, inventive Alloys 4 and 5 had an austenitic microstructure and exhibited yield and tensile strength significantly better than for Comparative Alloy S31635.

The potential uses of these new alloys are numerous. As described and evidenced above, the austenitic stainless steel compositions described herein are capable of replacing S31600 and notably S31635 in many applications. Additionally, due to the high cost of nickel and molybdenum, a significant cost savings will be recognized by switching from S31600 and S31635 to the inventive alloy composition. Another benefit is, because these alloys are fully austenitic, they will not be susceptible to either a sharp ductile-to-brittle transition (DBT) at sub-zero temperature or 885° F. embrittlement at elevated temperatures. Therefore, unlike duplex alloys, they can be used at temperatures above 650° F. and are prime candidate materials for low temperature and cryogenic applications. It is expected that the corrosion resistance, formability, and processability of the alloys described herein will be very close to those of standard austenitic stainless steels. Specific articles of manufacture for which the alloys according to the present disclosure would be particularly advantageous include, for example, flexible connectors for automotive exhaust and other applications, bellows, flexible pipe, and chimney/flue liners. Those having ordinary skill may readily manufacture these and other articles of manufacture from the alloys according to the present disclosure using conventional manufacturing techniques.

Although the foregoing description has necessarily presented only a limited number of embodiments, those of ordinary skill in the relevant art will appreciate that various changes in the apparatus and methods and other details of the examples that have been described and illustrated herein may be made by those skilled in the art, and all such modifications will remain within the principle and scope of the present disclosure as expressed herein and in the appended claims. It is understood, therefore, that the present invention is not limited to the particular embodiments disclosed or incorporated herein, but is intended to cover modifications that are within the principle and scope of the invention, as defined by the claims. It will also be appreciated by those skilled in the art that changes could be made to the embodiments above without departing from the broad inventive concept thereof.

What is claimed is:

1. An austenitic stainless steel consisting of, in weight percentages:
   up to 0.20 C;
   greater than 4.0 to 9.0 Mn;
   up to 1.0 Si;
   17.0 to less than 20.0 Cr;
   1.0 to 6.5 Ni;
   up to 3.0 Mo;
   0.05 to less than 0.20 N;
   0.1 to 1.5 Nb;
   up to 0.050 P;
   up to 0.030 S;
   0.0005 to 0.01 B;
   up to 1.0 Co;
   Fe; and
   impurities.

2. The austenitic stainless steel of claim 1, wherein:

$4.0 \leq (Ni+Co) \leq 7.5$.

3. The austenitic stainless steel of claim 1, wherein:

$(7.5(C)) \leq (Nb) \leq 1.5$.

4. The austenitic stainless steel of claim 1, wherein:

$(7.5(C)) \leq (Nb) \leq 1.0$.

5. The austenitic stainless steel of claim 1, wherein the Nb is limited to 0.5 to 1.5.

6. The austenitic stainless steel of claim 1, wherein the Nb is limited to 0.7 to 1.5.

7. The austenitic stainless steel of claim 1, wherein the austenitic stainless steel has a $PRE_N$ up to 30.

8. The austenitic stainless steel of claim 1, wherein the austenitic stainless steel has a $PRE_N$ value greater than 22.

9. The austenitic stainless steel of claim 1, wherein the austenitic stainless steel has a $PRE_N$ value greater than 22 up to 30.

10. An austenitic stainless steel consisting of, in weight percentages:
    up to 0.20 C;
    greater than 4.0 to 9.0 Mn;
    up to less than 1.0 Si;
    18.0 to less than 20.0 Cr;
    1.0 to 6.5 Ni;
    up to 3.0 Mo;
    0.05 to less than 0.20 N;
    0.1 to 1.5 Nb;
    0.0005 to 0.01 B;
    up to 1.0 Co;
    Fe; and
    impurities, wherein the austenitic stainless steel has a ferrite number less than 10.

11. The austenitic stainless steel of claim 10, wherein the austenitic stainless steel has a ferrite number greater than 0 up to 10.

12. The austenitic stainless steel of claim 10, wherein the austenitic stainless steel has a ferrite number of 3 to 5.

13. The austenitic stainless steel of claim 1, wherein the austenitic stainless steel has an $MD_{30}$ value less than 20° C.

14. The austenitic stainless steel of claim 1, wherein the austenitic stainless steel has an $MD_{30}$ value less than −10° C.

15. The austenitic stainless steel of claim 1, wherein the austenitic stainless steel has a yield strength greater than a yield strength of UNS S31635 alloy.

16. The austenitic stainless steel of claim 1, wherein the C is limited to up to 0.10.

17. The austenitic stainless steel of claim 1, wherein the Mn is limited to greater than 4.0 to 8.0.

18. The austenitic stainless steel of claim 1, wherein the Mn is limited to greater than 4.0 to 6.5.

19. The austenitic stainless steel of claim 1, wherein the Ni is limited to 4.0 to 6.5.

20. The austenitic stainless steel of claim 1, wherein the Ni is limited to 5.5 to 6.5.

21. The austenitic stainless steel of claim 1, wherein the Mo is limited to 0.4 to 2.0.

22. The austenitic stainless steel of claim 1, wherein the Mo is limited to 0.5 to 2.0.

23. The austenitic stainless steel of claim 1, consisting of, in weight percentages:
    up to 0.10 C;
    greater than 4.0 to 9.0 Mn;
    up to 1.0 Si;
    17.0 to less than 20.0 Cr;
    1.0 to 6.5 Ni;
    0.40 to 2.0 Mo;
    0.08 to less than 0.20 N;
    0.1 to 1.5 Nb;
    up to 0.040 P;
    up to 0.030 S;
    0.0005 to 0.008 B;
    Fe; and
    impurities.

24. The austenitic stainless steel of claim 1, consisting of, in weight percentages:
    up to 0.08 C;
    greater than 4.0 to 6.5 Mn;
    up to 1.0 Si;
    17.0 to 19.5 Cr;
    4.0 to 6.5 Ni;
    0.5 to 2.0 Mo;
    0.08 less than 0.20 N;
    0.1 to 1.0 Nb;
    up to 0.050 P;
    up to 0.030 S;
    0.0005 to 0.008 B;
    Fe; and
    impurities.

25. An article of manufacture including the stainless steel recited in claim 1.

26. The article of manufacture of claim 25, wherein the article is selected from the group consisting of a flexible connector, a bellows, a flexible pipe, a chimney liner, and a flue liner.

* * * * *